United States Patent
Dalal et al.

(10) Patent No.: US 10,346,193 B1
(45) Date of Patent: Jul. 9, 2019

(54) EFFICIENT PLACEMENT OF VIRTUAL MACHINES BASED ON CACHE HIT RATIO

(71) Applicant: Veritas Technologies LLC, Mountain View, CA (US)

(72) Inventors: Chirag Dalal, Pune (IN); Pradip Kulkarni, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 136 days.

(21) Appl. No.: 15/683,757

(22) Filed: Aug. 22, 2017

(51) Int. Cl.
  *G06F 9/455* (2018.01)
  *G06F 12/084* (2016.01)
  *G06F 12/0875* (2016.01)

(52) U.S. Cl.
  CPC ........ *G06F 9/45558* (2013.01); *G06F 12/084* (2013.01); *G06F 12/0875* (2013.01); *G06F 2009/4557* (2013.01); *G06F 2212/152* (2013.01); *G06F 2212/6042* (2013.01); *G06F 2212/62* (2013.01)

(58) Field of Classification Search
  CPC ............. G06F 9/45558; G06F 12/0875; G06F 12/084; G06F 2009/4557; G06F 2212/62; G06F 2212/6042; G06F 2212/152
  See application file for complete search history.

(56) References Cited

U.S. PATENT DOCUMENTS

| | | | | |
|---|---|---|---|---|
| 2012/0226866 | A1* | 9/2012 | Bozek | G06F 9/45558 711/122 |
| 2014/0096139 | A1* | 4/2014 | Alshinnawi | G06F 11/008 718/103 |
| 2014/0157040 | A1* | 6/2014 | Bennah | G06F 11/0793 714/2 |
| 2014/0157058 | A1* | 6/2014 | Bennah | G06F 11/3604 714/38.1 |
| 2015/0236971 | A1* | 8/2015 | Sesha | H04L 47/70 709/226 |

* cited by examiner

*Primary Examiner* — Benjamin C Wu
(74) *Attorney, Agent, or Firm* — FisherBroyles, LLP (57) ABSTRACT

The disclosed computer-implemented method for efficient placement of virtual machines may include (1) allocating space in a cache shared by a group of virtual machines to add a new virtual machine, (2) receiving data requests from the new virtual machine for the cache, (3) recording each of the data requests as a cache hit or a cache miss in a list based on availability of the data in the cache, (4) determining a ratio of cache hits to cache misses for the new virtual machine based on the recorded data requests, and (5) placing the new virtual machine in the group of virtual machines when the ratio of cache hits to cache misses exceeds a threshold, such that the data backup device efficiently utilizes the cache for servicing the data requests from the new virtual machine. Various other methods, systems, and computer-readable media are also disclosed.

20 Claims, 4 Drawing Sheets

| New Virtual Machine Data Requests | 128 Cache Hit | Cache Miss |
|---|---|---|
| 1 | X | |
| 2 | X | |
| 3 | X | |
| 4 | X | |
| 5 | | X |

*FIG. 4*

EFFICIENT PLACEMENT OF VIRTUAL MACHINES BASED ON CACHE HIT RATIO

BACKGROUND

Computing devices may host virtual machines for use in a number of applications, such as the testing and development of software prior to being deployed on a machine for end users. Data utilized by groups of virtual machines, however, often requires periodic backups to their associated virtual disks.

Traditional systems for placing virtual machines in virtual machine groups often send and receive backup data to virtual disks from a number of different locations. However, such systems typically send and retrieve the data to the virtual disks without accounting for shared data that may be available to all of the virtual machines in the group, thereby increasing the time needed for performing data backups. Accordingly, the instant disclosure identifies and addresses a need for additional and improved systems and methods for efficient placement of virtual machines.

SUMMARY

As will be described in greater detail below, the instant disclosure describes various systems and methods for efficient placement of virtual machines by placing a new virtual machine in a group of virtual machines when a ratio of cache hits to cache misses exceeds a threshold, such that a data backup device efficiently utilizes the cache for servicing data requests for the group of virtual machines.

In one embodiment, a method for efficient placement of virtual machines may include (1) allocating, by a data backup device, space in a cache shared by a group of virtual machines to add a new virtual machine, (2) receiving, by the data backup device, data requests from the new virtual machine for the cache, (3) recording, by the data backup device, each of the data requests as a cache hit or a cache miss in a list based on availability of the data in the cache, (4) determining, by the data backup device, a ratio of cache hits to cache misses for the new virtual machine based on the recorded data requests, and (5) placing, by the data backup device, the new virtual machine in the group of virtual machines when the ratio of cache hits to cache misses exceeds a threshold, such that the data backup device efficiently utilizes the cache for servicing the data requests from the new virtual machine in the group of virtual machines.

In some examples, the method may further include sending data from the cache to the new virtual machine to service the data requests. In some examples, the method may further include (1) retrieving data from another data source to service the data requests when the ratio of cache hits to cache misses is below the threshold, (2) storing the data in the cache, and (2) sending the list to a placement engine for placing the new virtual machine in another group of virtual machines.

In some examples the data requests may include read/write requests to virtual disks associated with the new virtual machine. In some examples, the read/write requests may include a data backup operation for the new virtual machine and the data backup operation may include an incremental data backup operation.

In some examples, recording the data requests may include (1) recording a request in the data requests as a cache hit in the list when the data is available in the cache and (2) recording a request in the data requests as a cache miss in the list when the data is unavailable in the cache. In some examples, the cache may include a unified cache for virtual disks associated with the group of virtual machines.

In one example, a system for efficient placement of virtual machines may include several modules stored in memory, including an (1) allocation module that allocates space in a cache shared by a group of virtual machines to add a new virtual machine, (2) a receiving module that receives data requests from the new virtual machine for the cache, (3) a recording module that records each of the data requests as a cache hit or a cache miss in a list based on availability of the data in the cache, (4) a determination module that records a ratio of cache hits to cache misses for the new virtual machine based on the recorded data requests, (5) a placement module that records the new virtual machine in the group of virtual machines when the ratio of cache hits to cache misses exceeds a threshold, such that a data backup device efficiently utilizes the cache for servicing data requests from the new virtual machine in the group of virtual machines, and (6) at least one physical processor that executes the allocation module, the receiving module, the recording module, the determination module, and the placement module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) allocate space in a cache shared by a group of virtual machines to add a new virtual machine, (2) receive data requests from the new virtual machine for the cache, (3) record each of the data requests as a cache hit or a cache miss in a list based on availability of the data in the cache, (4) determine a ratio of cache hits to cache misses for the new virtual machine based on the recorded data requests, and (5) place the new virtual machine in the group of virtual machines when the ratio of cache hits to cache misses exceeds a threshold, such that a data backup device efficiently utilizes the cache for servicing the data requests from the new virtual machine in the group of virtual machines.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for efficient placement of virtual machines. As will be explained in greater detail below, by recording virtual machine data requests as a cache hit or a cache miss based on availability of the data in a cache, the systems and methods described herein may be able to determine cache utilization prior to placing a new virtual machine in a group of virtual machines (e.g., a hypervisor). By determining the cache utilization, the various systems and methods described herein may place new virtual machines having a similar cache utilization (e.g., a similar ratio of cache hits to cache misses) to the group of virtual machines such that a data backup device efficiently utilizes the cache for servicing data requests for the virtual machine group. By applying cache utilization in this way, the systems and methods described herein may improve the functioning and/or performance of a computing device (such as a backup computing device) by reducing cache pollution and/or latency in servicing data backup requests from non-cache sources, thereby resulting in faster data backup operations.

Figure 1:
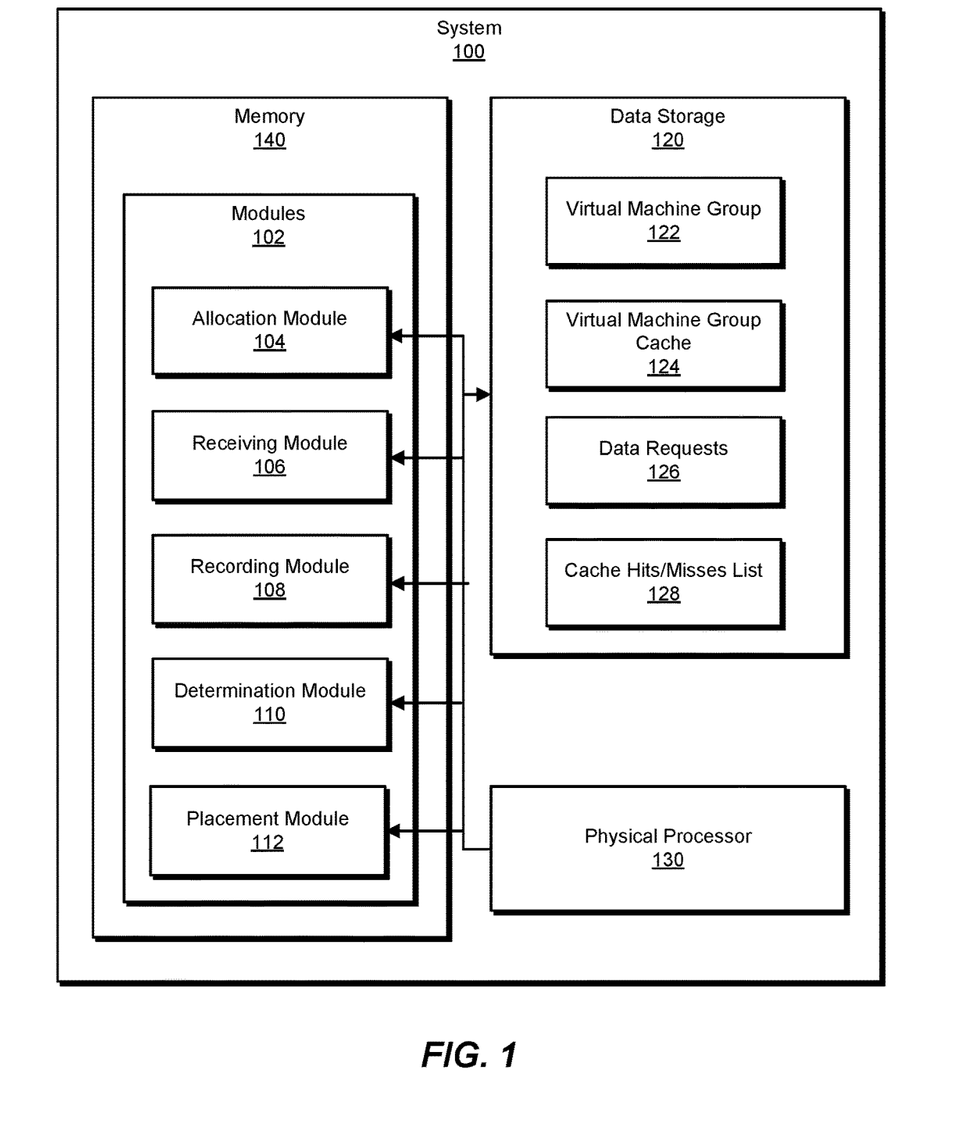
FIG. 1 is a block diagram of an example system for efficient placement of virtual machines.
Figure 2:
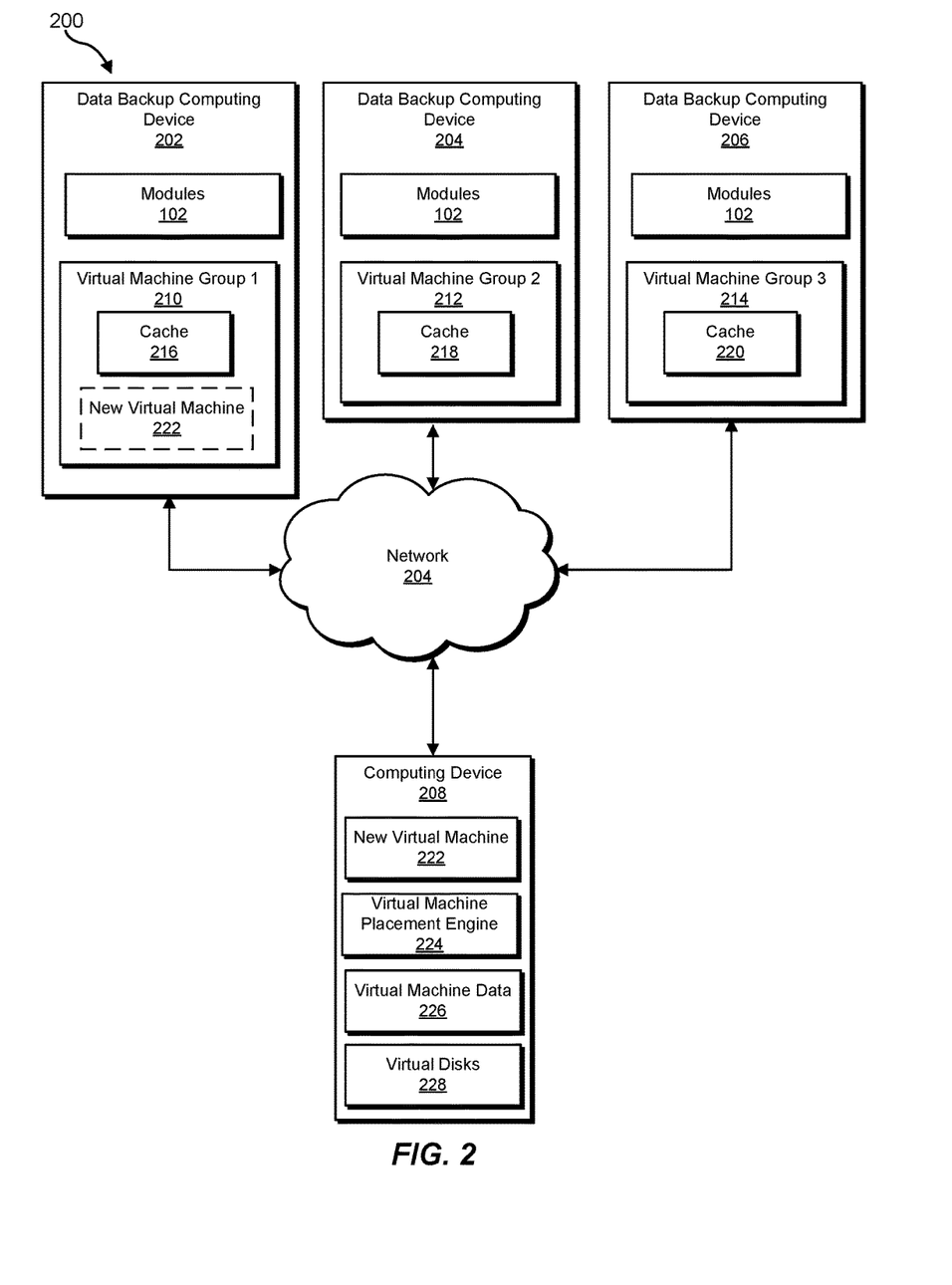
FIG. 2 is a block diagram of an additional example system for efficient placement of virtual machines.

The following will provide, with reference to FIGS. 1-2, detailed descriptions of example systems for efficient placement of virtual machines. Detailed descriptions of corresponding computer-implemented methods will also be provided in connection with FIGS. 3 and 4.

FIG. 1 is a block diagram of an example system 100 for efficient placement of virtual machines. As illustrated in this figure, example system 100 may include one or more modules 102 for performing one or more tasks. As will be explained in greater detail below, modules 102 may include an allocation module 104 for allocating space in a cache (e.g., virtual machine group cache 124) shared by a group of virtual machines (e.g., virtual machine group 122) to add a new virtual machine. Modules 102 may additionally include a receiving module 106 for receiving data requests 126 from the new virtual machine for the cache. Modules 102 may further include a recording module 108 for recording each of the data requests, received by the receiving module 106, as a cache hit or a cache hit in a list (e.g., cache hit/miss 128) based on the availability of data in the cache. Modules 102 may also include a determination module 110 for determining a ratio of cache hits to cache misses for the new virtual machine based on the data requests recorded by the recording module 108. Modules 102 may additionally include a placement module 112 for placing the new virtual machine in the group of virtual machines when the ratio of cache hits to cache misses exceeds a threshold. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., data backup computing devices 202, 204, 206 and/or computing device 210). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate efficient placement of virtual machines. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, example system 100 may also include one or more additional data storage devices, such as data storage 120. Data storage 120 generally represents any type or form of data storage device capable of storing data. In one example, data storage 120 may include virtual machine group 122, virtual machine group cache 124, data requests 126, and cache hit/miss list 128. In some examples, virtual machine group 122 may include multiple virtual machines, each having at least one virtual disk and sharing a common cache (e.g., virtual machine group cache 124) from which data requests 126 (e.g., backup data input/output requests) may be serviced. The term "virtual machine," as used herein, generally refers to any operating system environment that is abstracted from computing hardware by a virtual machine manager (e.g., a hypervisor).

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by data backup computing devices 202, 204, and 206, computing device 208, and/or any other suitable computing system. As will be described in greater detail below, one or more of modules 102 from FIG. 1 may, when executed by at least one processor of data backup computing devices 202, 204, and 206 and/or computing device 208, enable data backup computing devices 202, 204, and 206 and/or computing device 208 to efficiently place virtual machines.

Data backup computing devices 202, 204, and 206 generally represent any type or form of computing device that is capable of servicing backup data requests from virtual machines and/or placing new virtual machines into virtual machine groups. In one example, data backup computing devices 202, 204, and 206 may include hypervisors that are capable of evaluating and placing new virtual machines (e.g., new virtual machine 222) into virtual machine groups 210, 212, or 214. As will be described in greater detail below, in one example, data backup computing devices 210, 212, and/or 214 may utilize modules 102 to receive and evaluate data requests from new virtual machine 222 and compare the requested data to virtual machine data in caches 216, 218, and/or 220 for virtual machine groups 210, 212, and/or 214. Additional examples of servers 202, 204, and 206 include, without limitation, storage servers, database servers, application servers, and/or web servers configured to run certain software applications and/or provide various storage, database, and/or web services. Although illustrated as single entities in FIG. 2, each server 202, 204, and/or 206 may include and/or represent a plurality of servers that work and/or operate in conjunction with one another.

Computing device 208 generally represents any type or form of computing device capable of reading computer-executable instructions. As one example, computing device 208, may include and endpoint device running client-side software (e.g., testing and development software) that generates virtual machine data 226 for new virtual machine 222, on one or more virtual disks 208, for eventual placement (via virtual machine placement engine 224) on one of the data backup computing devices 202, 204, or 206. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, so-called Internet-of-Things devices (e.g., smart appliances, etc.), gaming consoles, variations or combinations of one or more of the same, or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from that shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
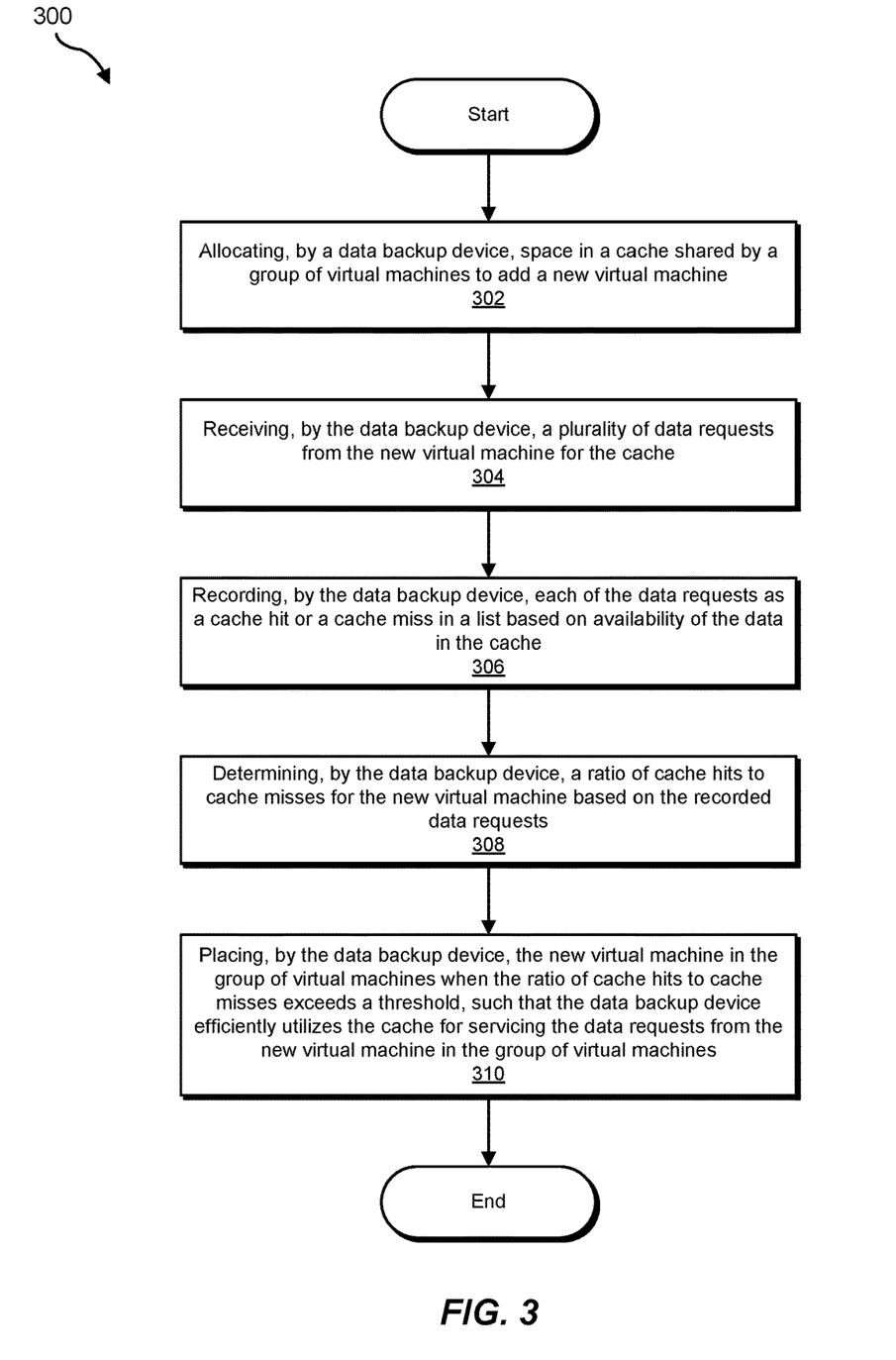
FIG. 3 is a flow diagram of an example method for efficient placement of virtual machines.

FIG. 3 is a flow diagram of an example computer-implemented method 300 for efficient placement of virtual machines. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may allocate, by a data backup device, space in a cache shared by a group of virtual machines. In one example, the space may be allocated a new virtual machine to be added to the virtual machine group. For example, allocation module 104 may, as part of data backup computing device 206 in FIG. 2, allocate space in cache 216, which is shared by virtual machines in virtual machine group 210, for new virtual machine 222. In some examples, cache 216 may include a unified cache for virtual disks associated with the group of virtual machines. In some examples, cache 216 may include a flash memory device. In some examples, new virtual machine 222 may be initially sent to data backup computing device 202 by virtual machine placement engine 224 on computing device 208. For example, virtual machine placement engine 224 may make an initial determination, based on processing, memory, and/or bandwidth requirements for new virtual machine 222, that new virtual machine 222 should be placed on data backup computing device 202.

At step 304 in FIG. 3, one or more of the systems described herein may receive, by the data backup device, multiple data requests from the new virtual machine for the cache. For example, receiving module 106 may, as part of data backup computing device 202, receive data requests 126 from new virtual machine 222 for comparison with cache 216. In some examples, the data requests may include read/write requests to virtual disks 228 associate with new virtual machine 222. In some examples, the read/write requests may include a data backup operation for new virtual machine 222 on data backup computing device 202. In some examples, the data backup operation may include a full data backup of new virtual machine 222 or an incremental backup of new virtual machine 222.

At step 306 in FIG. 3, one or more of the systems described herein may record, by the data backup device, each of the data requests received at step 302 as a cache hit or a cache miss in a list based on the availability of the requested data in the cache. For example, recording module 108 may, as part of data backup computing device 202, record data requests 126 received from new virtual machine 222 in cache hit/miss list 128. As an example, recording module 108 may record a data request 126 as a cache hit in list 128 when the requested data is available in cache 216. Additionally, or alternatively, recording module 108 may record a data request 126 as a cache miss in list 128 when the requested data is unavailable in cache 216.

Figure 4:
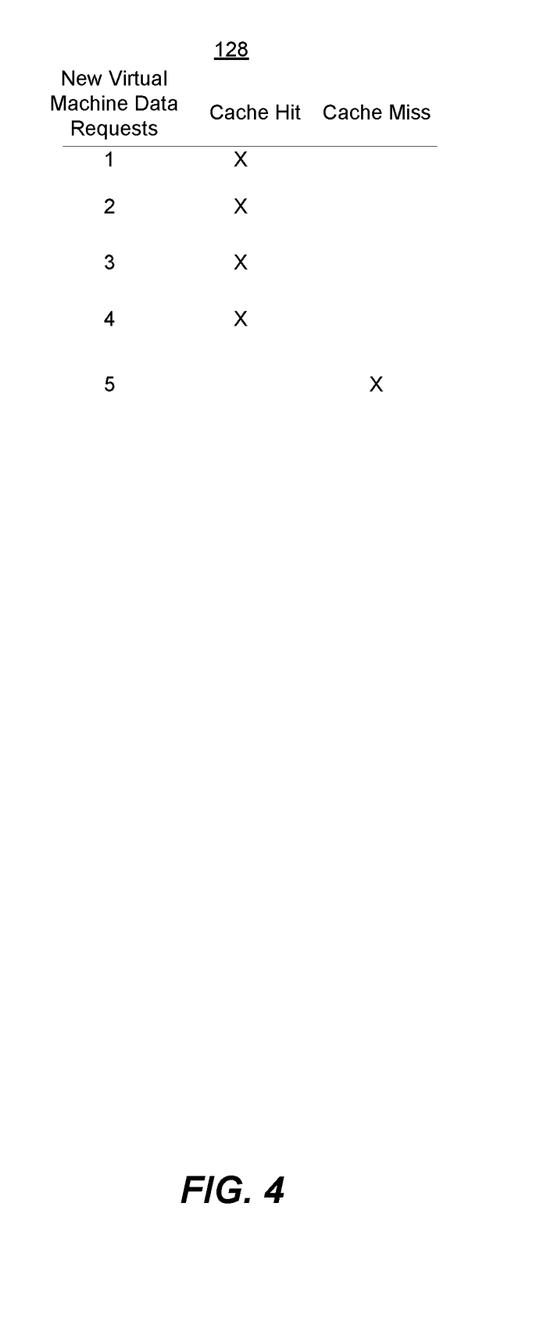
FIG. 4 is a flow diagram of an example cache hit/cache miss list utilized for efficient placement of virtual machines.

FIG. 4 illustrates an example cache hit/miss list 128. In this example, data requests 126 received from new virtual machine 222 may be recorded by recording module 108 based on availability of the requested data in cache 216. Thus, data corresponding to data requests 1-4 is located in cache 216 and is recorded by recording module 108 as cache hits while data corresponding to data request 5 is not located in cache 216 and is recorded as a cache miss.

Returning now to FIG. 3, at step 310, one or more of the systems described herein may determine, by the data backup device, each of the data requests for the new virtual machine based on the recorded data requests at step 308. For example, determination module 110 may, as part of data backup computing device 202, determine a ratio of cache hits to cache misses based on the recorded data requests 126 for new virtual machine 222 as shown in the list 128 in FIG. 4. For example, the determination module 110 may determine, from the list 128, that there are four cache hits and one cache miss for data requests 126 from new virtual machine 222. Thus, for example, determination module 110 may determine the ratio of cache hits to cache misses to be 80%.

At step 312 in FIG. 3, one or more of the systems described herein may place, by the data backup device, the new virtual machine in the group of virtual machines when the ratio of cache hits to cache misses exceeds a threshold, such that the data backup device efficiently utilizes the cache for servicing the data requests from the new virtual machine in the group of virtual machines. For example, placement module 112 may, as part of data backup computing device 202, place new virtual machine 222 in virtual machine group 210 when a ratio of cache hits to cache misses in cache hit/miss list 128 is greater than a threshold of 50% (or some other predetermined percentage of cache hits to cache misses). Thus, since the majority of data requests 126 may be serviced from data available in cache 216 on data backup computing device 202, cache 216 may be efficiently utilized with respect to all of the virtual machines in virtual machine group 210, which may in turn lead to faster data backups. For example, as discussed above, cache 216 may include a flash memory device, which may allow for faster data input/output operations (e.g., data backups) than is common with other storage computing devices.

In some examples, placement module 112 may send data available in cache 216 to service requests from new virtual machine 222, which may have been added to virtual machine group 210 (e.g., data from cache 216 may be sent to the virtual disks for new virtual machine 222). Additionally, placement module 112 may retrieve data unavailable in cache 216 (e.g., virtual machine data 226 on computing device 202) to service requests from new virtual machine 222 and then store the retrieved data in cache 216 for virtual machine group 210.

In some examples, placement module 112 may refrain from placing new virtual machine 222 in virtual machine group 210 when the ratio of cache hits to cache misses in list 128 is below a threshold (e.g., less than 50% or some other predetermined percentage of cache hits to cache misses). Thus, since less than a majority of data requests 126 may be serviced from available data in cache 216 on data backup computing device 202, cache 216 may be inefficient with respect to servicing new virtual machine 222, thereby potentially slowing data backups for the virtual machine group 210 if new virtual machine 222 is added.

In some examples, placement module 112 may then send list 128 to placement engine 224 on computing device 202 for selecting another group of virtual machines (e.g., virtual machine group 212 or virtual machine group 214). In these examples, placement engine 224 may be utilized to examine the cache hits to cache misses in list 128 and select another virtual machine group for new virtual machine 222 that may yield a higher cache utilization (e.g., higher than the threshold) than cache 216 in virtual machine group 210.

As explained above in connection with FIGS. 1-4, a computing device may associate itself with groups of virtual machines and, in particular, their virtual disks. In some examples, the computing device may act as a filtering module that intercepts reads and writes to the virtual disks during full and incremental backup operations. In addition, the computing device may have a unified cache for various virtual disks. When a virtual machine starts, its virtual disks may be opened for input/output (e.g., data backup) operations by a hypervisor. At this point, the computing device may reserve a cache space for the virtual disks. When input/output operations occur to the virtual disks, the computing device may serve data requests from the virtual machine using data from its existing cached data, if it is available, and record the event as a cache hit. If the data is not already available in the cache, the computing device may retrieve the data for the virtual machine from another data source, store a copy of the data in the reserved cache space, and record the event as a cache miss.

In some examples, the computing device may maintain list of accesses (e.g., data requests) to the unified cache and record whether a data request was a cache hit or a cache miss in a list. The computing device may then use the list to determine the proximity of the input/output operations of a new virtual machine to virtual machines the computing device is currently serving.

In one example, a higher amount of cache hits may be indicative of a higher proximity (e.g., similarity) of the data utilized by the new virtual machine and the existing virtual machines being served by the computing device, thereby making the new virtual machine and the existing virtual machines suitable to be hosted on the same hypervisor. In addition, the similarity may be indicated by input/output data patterns of the new virtual machine being similar to input/output data patterns of the existing virtual machines already running on the hypervisor.

In contrast, a higher amount of cache misses may be indicative of a cache not being efficient for the new virtual machine. In some examples, the computing device may contact a virtual machine placement engine that placed the new virtual machine on the hypervisor. The computing device may then provide information about data accesses (e.g., the list of cache hits and cache misses) to the virtual machine placement engine to enable the new virtual machine to be placed more appropriately on a different hypervisor. The virtual machine placement engine may then use the received information to determine another suitable hypervisor. In some examples, the virtual machine placement engine may contact all existing hypervisors to determine an input/output data pattern that most closely resembles the one provided to it for the new virtual machine and provision to place the new virtual machine on that hypervisor.

By applying cache utilization during data/input output operations to place new virtual machines in a hypervisor, the systems and methods described herein may reduce cache pollution and/or latency in servicing data backup requests from non-cache sources, thereby resulting in more efficient virtual machine placement and faster data backup operations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the modules described herein may configure a computing system (e.g., a server) to facilitate multi-tenancy for one or more of the functions described herein. For example, one or more of the modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor).

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), variations or combinations of one or more of the same, or any other suitable mobile computing devices. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using modules that perform certain tasks. These modules may include script, batch, or other executable files that may be stored on a computer-readable storage medium or in a computing system. In some embodiments, these modules may configure a computing system to perform one or more of the example embodiments disclosed herein.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for efficient placement of virtual machines, at least a portion of the method being performed by a computing device comprising at least one processor, the method comprising:
    allocating, by a data backup device, space in a cache shared by a group of virtual machines to add a new virtual machine;
    receiving, by the data backup device, a plurality of data requests from the new virtual machine for the cache;
    recording, by the data backup device, each of the data requests as a cache hit or a cache miss in a list based on availability of the data in the cache;
    determining, by the data backup device, a ratio of cache hits to cache misses for the new virtual machine based on the recorded data requests; and
    placing, by the data backup device, the new virtual machine in the group of virtual machines when the ratio of cache hits to cache misses exceeds a threshold, such that the data backup device efficiently utilizes the cache for servicing the data requests from the new virtual machine in the group of virtual machines.

2. The method of claim 1, further comprising sending data from the cache to the new virtual machine to service the data requests.

3. The method of claim 1, further comprising:
retrieving data from another data source to service the data requests when the ratio of cache hits to cache misses is below the threshold;
storing the data in the cache; and
sending the list to a placement engine for placing the new virtual machine in another group of virtual machines.

4. The method of claim 1, wherein receiving the plurality of data requests from the new virtual machine comprises receiving a plurality of read/write requests to virtual disks associated with the new virtual machine.

5. The method of claim 4, wherein the read/write requests comprise a data backup operation for the new virtual machine.

6. The method of claim 5, wherein the data backup operation comprises an incremental data backup operation for the new virtual machine.

7. The method of claim 1, wherein recording each of the data requests as a cache hit or a cache miss in a list based on availability of the data in the cache comprises:
recording a request in the data requests as a cache hit in the list when the data is available in the cache; and
recording a request in the data requests as a cache miss in the list when the data is unavailable in the cache.

8. The method of claim 1, wherein the cache comprises a unified cache for virtual disks associated with the group of virtual machines.

9. A system for efficient placement of virtual machines, the system comprising:
an allocation module, stored in memory, that allocates space in a cache shared by a group of virtual machines to add a new virtual machine;
a receiving module, stored in memory, that receives a plurality of data requests from the new virtual machine for the cache;
a recording module, stored in memory, that records each of the data requests as a cache hit or a cache miss in a list based on availability of the data in the cache;
a determination module, stored in memory, that records a ratio of cache hits to cache misses for the new virtual machine based on the recorded data requests;
a placement module, stored in memory, that records the new virtual machine in the group of virtual machines when the ratio of cache hits to cache misses exceeds a threshold, such that a data backup device efficiently utilizes the cache for servicing data requests from the new virtual machine in the group of virtual machines; and
at least one physical processor that executes the allocation module, the receiving module, the recording module, the determination module, and the placement module.

10. The system of claim 9, wherein the placement module further sends data from the cache to the new virtual machine to service the data requests.

11. The system of claim 9, wherein the placement module further:
retrieves data from another data source to service the data requests when the ratio of cache hits to cache misses is below the threshold;
stores the data in the cache; and
sends the list to a placement engine for placing the new virtual machine in another group of virtual machines.

12. The system of claim 9, wherein the receiving module receives the plurality of data requests from the new virtual machine by receiving a plurality of read/write requests to virtual disks associated with the new virtual machine.

13. The system of claim 12, wherein the read/write requests comprise a data backup operation for the new virtual machine.

14. The system of claim 13, wherein the data backup operation comprises an incremental data backup operation for the new virtual machine.

15. The system of claim 9, wherein the recording module records each of the data requests as a cache hit or a cache miss in a list based on availability of the data in the cache by:
recording a request in the data requests as a cache hit in the list when the data is available in the cache; and
recording a request in the data requests as a cache miss in the list when the data is unavailable in the cache.

16. The system of claim 9, wherein the cache comprises a unified cache for virtual disks associated with the group of virtual machines.

17. A non-transitory computer-readable medium comprising one or more computer-executable instructions that, when executed by at least one physical processor of a computing device, cause the computing device to:
allocate space in a cache shared by a group of virtual machines to add a new virtual machine;
receive a plurality of data requests from the new virtual machine for the cache;
record each of the data requests as a cache hit or a cache miss in a list based on availability of the data in the cache;
determine a ratio of cache hits to cache misses for the new virtual machine based on the recorded data requests; and
place the new virtual machine in the group of virtual machines when the ratio of cache hits to cache misses exceeds a threshold, such that a data backup device efficiently utilizes the cache for servicing the data requests from the new virtual machine in the group of virtual machines.

18. The non-transitory computer-readable medium of claim 17, wherein the one or more computer-executable instructions further cause the computing device to send data from the cache to the new virtual machine to service the data requests.

19. The non-transitory computer-readable medium of claim 17, wherein the one or more computer-executable instructions further cause the computing device to:
retrieve data from another data source to service the data requests when the ratio of cache hits to cache misses is below the threshold;
store the data in the cache; and
send the list to a placement engine for placing the new virtual machine in another group of virtual machines.

20. The non-transitory computer-readable medium of claim 17, wherein the plurality of data requests comprise a plurality of read/write requests to virtual disks associated with the new virtual machine.

* * * * *